March 22, 1966  R. K. BANISTER ETAL  3,241,224
METHOD AND MACHINE FOR COUPLING PIPES
Original Filed Jan. 10, 1963  2 Sheets-Sheet 1

INVENTOR
Ronald K. Banister
Olaf Johanson
William Burley
James J. Boyce
by Arne D. Fors
ATTORNEY

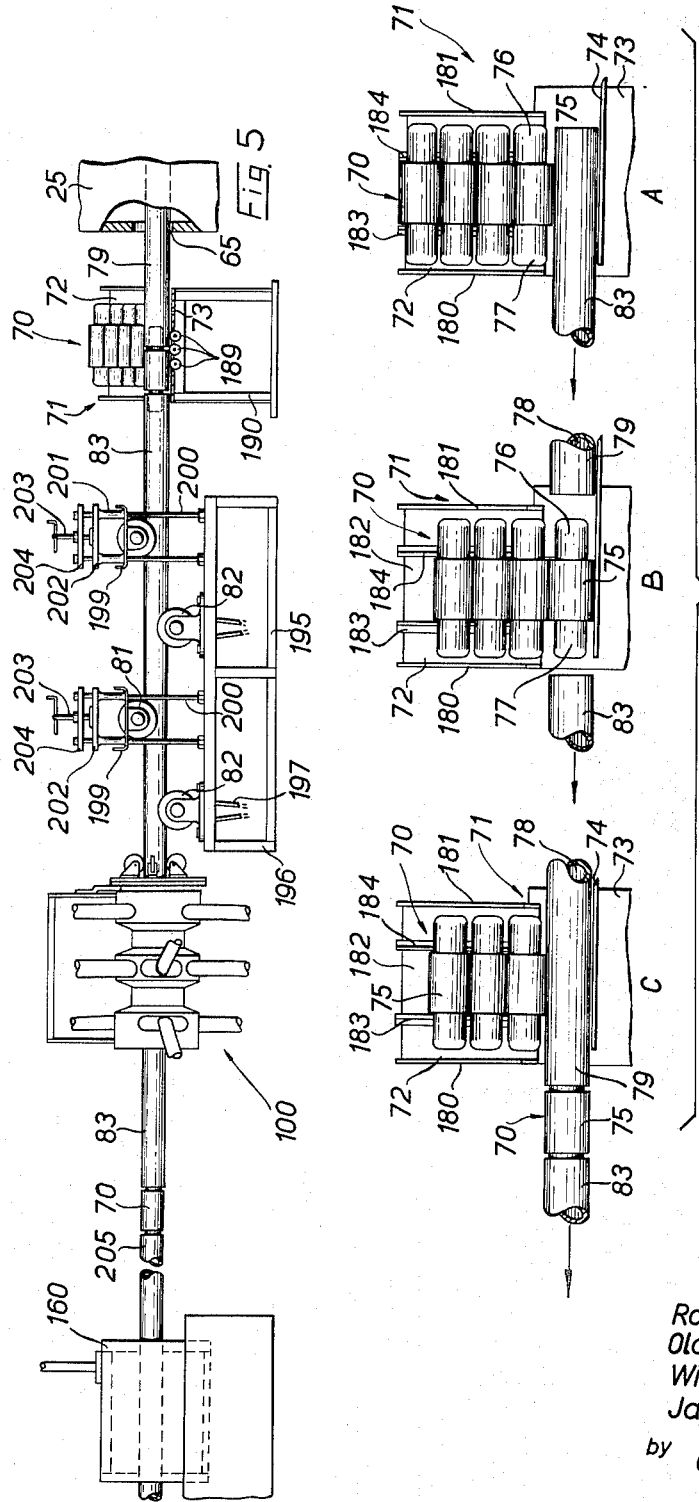

United States Patent Office 3,241,224
Patented Mar. 22, 1966

3,241,224
METHOD AND MACHINE FOR COUPLING PIPES
Ronald K. Banister, Olaf J. Johanson, William E. Burley, and James J. Boyce, Edmonton, Alberta, Canada, assignors, by mesne assignments, to Banister Construction (1963) Ltd., Edmonton, Alberta, Canada, a company of Alberta
Original application Jan. 10, 1963, Ser. No. 250,705. Divided and this application Apr. 10, 1963, Ser. No. 272,080
5 Claims. (Cl. 29—429)

The invention is a division of that disclosed in our United States patent application Serial No. 250,705, filed January 10, 1963, for Pipe Coating Process, the divisional subject matter herein being that directed to a coupler apparatus for automatically and positively joining a length of pipe or the like tubular goods with a next adjacent length of pipe or conduit.

This invention relates to a method and apparatus for coupling tubular goods. It is particularly directed to a method and apparatus for coupling rod, pipe and the like tubular goods.

In pipe treating operations such as the coating of the exterior surface of metal pipe with a synthetic resin or the like material, it is imperative that means be provided for coupling adjacent lengths of pipe for unsupported travel of the pipe for a predetermined period of time after the application of the coating in order that cooling and curing of the coating can take place. In the coupling operation, it is desirable that the coupling be accomplished automatically and positively while permitting quick and facile disengagement of the pipe lengths from each other when the desired curing and cooling treatments have been completed.

It is, therefore, a principal object of the present invention to provide an apparatus which automatically permits the positive engagement and disengagement of lengths of pipe or conduit, one with another.

Another object of the present invention is the provision of a pipe coupling apparatus which provides internal lateral support to adjacent lengths of pipe for travel through stretches lacking exterior support.

A further object of the present invention is the provision of a pipe coupling apparatus which is characterized by simplicity and economy of construction and reliability of operation.

These and other objects of the present invention, and the manner in which they can be obtained, will become apparent from the following detailed description, reference being made to the accompanying drawings, in which:

FIGURE 5 is a side elevation of the apparatus of the present invention illustrating its use as a step in the pipe coating process;

FIGURE 6 is a side elevation of the pipe coupler apparatus illustrating, in sequence, its operation in the coupling of adjacent lengths of pipe together.

Like reference characters refer to like parts throughout the description of the drawing.

Figure 1:
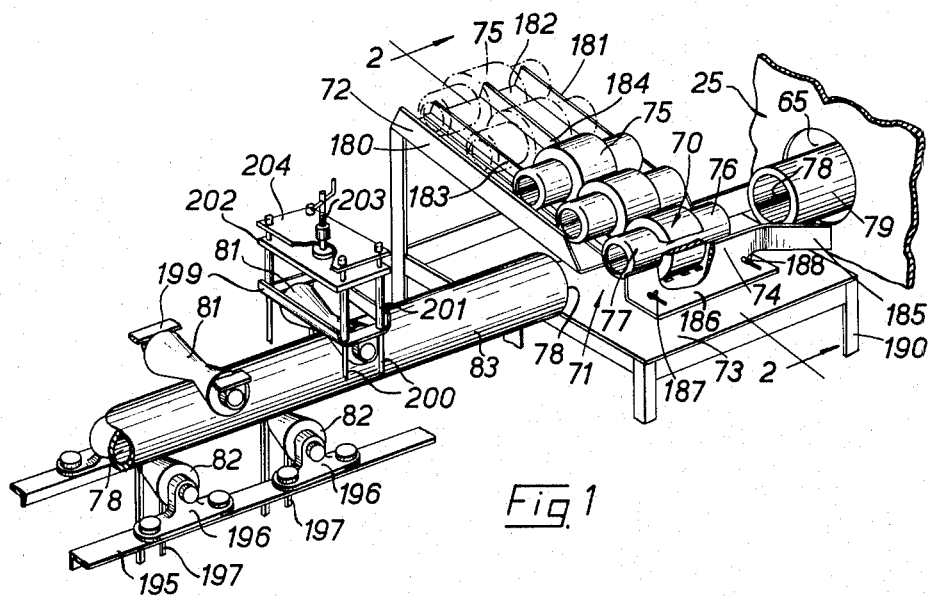
FIGURE 1 is a perspective view of a preferred embodiment of the apparatus of the present invention.

Inasmuch as a description of much of the mechanical construction and operation of the parent application is not necessary for a complete understanding of the divisional subject matter herein presented, only that part which is necessary is described hereinbelow.

With reference to the drawings, the pipe numbered 79 for purposes of identification emerging from oven 25 by way of wall opening 65 is coupled to the preceding pipe identified by numeral 83 by means of one of a plurality of couplers 70.

Couplers 70 each comprises a central upset portion 75 having a diameter substantially corresponding to at least the diameter of the pipe being coated. The opposite tubular end portions 76 and 77 of each coupler are of reduced diameter such that said ends will fit loosely within the bores 78 of pipes 79 and 83 as illustrated with reference to FIGURE 5.

A plurality of couplers 70 are stacked in a side-to-side relation on an inclined ramp 72 having side walls 180 and 181 and a guideway 182 defined by flanges 183 and 184. Central body portion 75 of each of the couplers is adapted to travel within guideway 182 as the coupler descends under the force of gravity.

An open-ended trough 71 in communication with ramp 72 is defined at the base of said ramp by ramp 72 on the one side, table base 73 below and vertical wall 74 on the side opposite to ramp 72, as most clearly illustrated with reference to FIGURES 1 and 2. The lowermost coupler 70 seated within trough 71 is axially aligned with pipe 79 emerging from oven 25 such that as pipe 79 abuts the coupler, the end 76 of the coupler is received within bore 78 of the pipe. To ensure alignment of the coupler with the emerging pipe, wall 74 carrying a pipe deflector 185 is adjustably mounted on base member 73 by means of a flanged portion 186 having grooves 187 adapted to receive lock screws 188.

Figure 2:
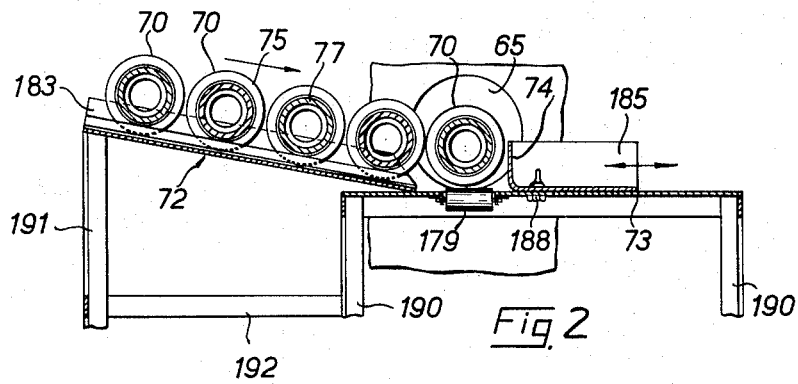
FIGURE 2 is a side elevation taken along the line 2—2 of FIGURE 1.

To facilitate axial travel of the lowermost coupler and of the pipe conveyed across table base 73, a plurality of cylindrical rollers 189 can be journalled in base 73 transverse to the longitudinal axis of the pipe, as most clearly illustrated by FIGURE 2.

Base member 73 is supported at each corner by a leg 190 and inclined ramp 72, which is supported at its lowermost end by abutment on base 73, is supported at its uppermost end by legs 191. Legs 191 preferably are connected to legs 190 by means of crosspieces 192 to provide for lateral rigidity to the assembly.

With reference to FIGURES 1 and 5, a pair of concave rollers 82 rotatably mounted on stand 195 by means of pedestals 196 are driven by V-belts 197 or the like means to impart a predetermined velocity to pipe 83 travelling thereover. To ensure pipe 83 travels at the peripheral speed of rollers 82 and to obviate slippage, a pair of press rollers 81 are disposed above rollers 82 in a staggered relation thereto such that pipe 83 passing between the two sets of rollers is positively gripped therebetween. Press rollers 81 are each journalled into a support member 199 which is slidably mounted at each corner on posts 200 by means of sleeves 201 connected thereto. A horizontal plate 202 secured to the upper extremities of sleeves 201 is adjustably supported by a rod 203 which is threaded into stationary plate or spider 204 rigidly secured to the upper extremities of corner posts 200. By raising or lowering rod 203 by rotation thereof, plate 202 is adjusted vertically thereby in turn adjusting press rollers 81 which are connected thereto by support member 199 and sleeves 201.

Coating head 100, as illustrated with reference to FIGURE 5, is disposed adjacent to rollers 81 and 82 such that pipe 83 travelling between said rollers is substantially concentric with the longitudinally extending central opening, not shown, of the said coating head. Pipe 83 passing through head 100 is coated with a resin as described in our parent application Serial No. 250,705 and passed through an air gap of about 23 feet without any exterior lateral support to permit curing and cooling of the liquid resin. A water quench is provided by liquid spray devices 160, one of which is shown, to further cool the resin coating below its melting point.

In operation, pipe 79 emerging from oven 25 is driven by rollers located within oven 25, not shown, at a linear velocity approximately 4 feet per minute faster than the velocity of preceding pipe 83, which is in the process of being coated in head 100. Pipe 79 in passing through open-ended trough 71 engages coupler 70 seated therein and receives end 76 of the coupler within bore 78. Upon the forward end of pipe 79 abutting the upset portion 75 of the coupler, the coupler is advanced with pipe 79 and rammed into the bore 78 of preceding pipe 83, as illustrated by FIGURE 5 and FIGURE 6–C. As soon as pipe 79 is engaged between rollers 81 and 82, the driver rollers propelling pipe from oven 25 are disengaged and pipe 79 is extracted from the oven by the inter-action of rollers 81 and 82.

With reference now to FIGURE 5, the forward end of pipe 83 passing through coating head 100 and the rearward end of coated pipe 205 which are coupled together by a coupler 70 are passed through an air gap of about 23 feet without exterior lateral support. Coupler 70 inserted into the bores of the two pipes connects the two lengths of pipe together to form, in effect, a single length of pipe substantially free from lateral deflection during the expanse of unsupported travel. It will be noted that the couplers provide internal lateral support only and are not adapted to prevent axial separation of the pipes. For this reason, the rearmost of each pair of coupled pipes propels the preceding pipe through the coating stage, air cooling stage and first stage of water quench. Once the pipes are cooled and cured sufficiently for handling, the velocity of the preceding pipe is accelerated causing the two pipes to separate axially.

With reference to FIGURE 6–A, it will be apparent that while pipe 83 is travelling through trough 71, couplers 70 stacked on inclined ramp 72 will be maintained displaced out of the trough by said pipe. When the rear end of pipe 83 clears trough 71, as illustrated by FIGURE 6–B, the lowermost coupler 70 will automatically roll by gravity into the trough and be axially aligned with pipe 79 approaching the trough. The remaining couplers 70 stacked on ramp 72 will follow each other down the ramp and automatically position themselves within guideway 182. FIGURE 6–C illustrates pipes 79 and 83 coupled together by a coupler 70 after coupler 70 has been rammed into pipe 83 by pipe 79.

Figure 3:
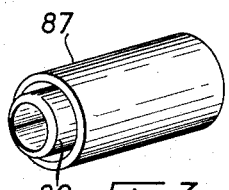
FIGURE 3 is a perspective view of another embodiment of pipe coupler illustrated in FIGURE 1.
Figure 7:
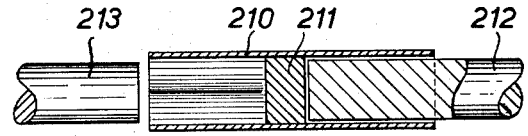
FIGURE 7 is a side elevation, partly in section, of an embodiment of rod coupler according to the present invention.
Figure 4:
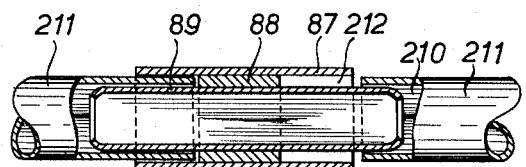
FIGURE 4 is a longitudinal section, partly in elevation, illustrating in more detail the pipe coupler embodiment illustrated in FIGURE 3.

FIGURES 3 and 4 illustrate another embodiment of pipe coupler comprising an outer sleeve 87 secured by a spot weld or the like means to an inner sleeve 88 which has a diameter greater than the diameter of pipe treated. Inner sleeve 88 is in turn secured to tube 89 which has a diameter less than the bores 210 of pipes 211. The annular spaces 212 defined at each end of the coupler by outer sleeve 87 and tube 89 are thus adapted to receive the ends of the pipes therein and shield the pipe ends from the application of the resin coat.

The present invention possesses a number of important advantages. Pipe and the like tubular goods can be automatically and positively coupled together for the provision of internal lateral support for travel through stretches lacking exterior support. Upon completion of the pipe coating step, the pipe can be readily separated into individual lengths for subsequent handling. The pipe coupling apparatus is simple in construction and substantially trouble free in operation.

It will be understood, of course, that modifications can be made in the preferred embodiment of the invention described and illustrated herein without departing from the scope of the invention as defined by the appended claims.

What we claim as new and desire to protect by Letters Patent of the United States is:

1. In a pipe coupling apparatus of the character described, the combination of an inclined ramp, an open-ended trough disposed at the base of said ramp at right angles to said ramp, said ramp being adapted to support a plurality of pipe couplers stacked on said ramp adapted to roll by gravity into said trough, and means for conveying pipe, one at a time, through said trough so arranged that the succeeding pipe of a pair of pipes travelling one behind the other is travelling at a velocity greater than the velocity of the preceding pipe such that the forward end of a succeeding pipe engages a coupler and advances the coupler for insertion into the rearward end of the preceding pipe.

2. In a pipe coupling apparatus of the type used for coupling the adjacent ends of lengths of pipe travelling one after the other on a conveyor, the combination of: means for supporting couplers adapted for removable engagement with the ends of adjacent lengths of pipe; means for positioning said couplers in axial alignment with said pipe; means for feeding said couplers, one at a time, onto said alignment means; and conveying means for conveying pipe past said couplers so constructed and arranged that the preceding pipe is temporarily travelling at a velocity less than the velocity of the succeeding pipe.

3. A pipe coupling apparatus of the character described for coupling the adjacent ends of two pipes travelling, one behind the other, on a conveyor comprising, in combination, means for supporting a plurality of couplers each having a central shoulder portion and shank portions adapted to fit loosely within the pipe bores, means for feeding said couplers, one at a time, between the ends of said pipes and means for axially aligning one of said couplers with said pipes such that the succeeding pipe conveyed past said coupler engages a coupler shank for advancing said coupler axially therewith, and means for controlling the travel of one of said pipes such that the free coupler shank is brought into engagement with and received by the rearward end of said preceding pipe for coupling said pipes together for the provision of internal lateral support.

4. The method of coupling a pair of pipes travelling axially, one behind the other, on a conveyor system for the provision of lateral support across an unsupported stretch which comprises the steps of advancing pipes axially, one at a time, through an open-ended trough, feeding pipe couplers, one at a time, into said trough, between the passage of each length of pipe, and controlling the relative velocities of the preceding and succeeding lengths of pipe such that the succeeding pipe travels faster than the preceding pipe until the succeeding pipe engages one end of a pipe coupler and advances said coupler to engage the opposite end of said pipe coupler with the preceding pipe.

5. The method as claimed in claim 4 in which the succeeding pipe travels at a velocity of about four feet per minute faster than the velocity of the preceding pipe until the pipes are coupled together.

References Cited by the Examiner

UNITED STATES PATENTS 2,771,669   1/1956   Armstrong et al. _____ 29—429

WHITMORE A. WILTZ, *Primary Examiner.*

THOMAS H. EAGER, *Examiner.*